US010699485B2

(12) United States Patent
Zielkowski

(10) Patent No.: US 10,699,485 B2
(45) Date of Patent: Jun. 30, 2020

(54) SYSTEMS AND METHODS FOR TEXTUAL OVERLAY IN AN AMUSEMENT PARK ENVIRONMENT

(71) Applicant: Universal City Studios LLC, Universal City, CA (US)

(72) Inventor: Amanda Kate Zielkowski, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 47 days.

(21) Appl. No.: 15/862,498

(22) Filed: Jan. 4, 2018

(65) Prior Publication Data

US 2019/0206132 A1 Jul. 4, 2019

(51) Int. Cl.
| | |
|---|---|
| *G06T 19/00* | (2011.01) |
| *G06F 3/01* | (2006.01) |
| *G02B 27/01* | (2006.01) |
| *G06K 9/00* | (2006.01) |
| *G06T 11/60* | (2006.01) |
| *A63G 31/16* | (2006.01) |

(52) U.S. Cl.
CPC ............ *G06T 19/006* (2013.01); *A63G 31/16* (2013.01); *G02B 27/017* (2013.01); *G06F 3/011* (2013.01); *G06K 9/00671* (2013.01); *G06T 11/60* (2013.01)

(58) Field of Classification Search
CPC ..... G06T 11/60; G06T 19/006; G02B 27/017; G06K 9/00671; G06F 3/011; A63G 31/16
See application file for complete search history.

(56) References Cited

U.S. PATENT DOCUMENTS

| | | | |
|---|---|---|---|
| 9,665,170 B1* | 5/2017 | Ross | G06F 3/011 |
| 9,669,321 B2 | 6/2017 | Reveley | |
| 2010/0226535 A1* | 9/2010 | Kimchi | G06F 3/013 |
| | | | 382/103 |
| 2011/0225069 A1 | 9/2011 | Cramer et al. | |
| 2011/0270135 A1 | 11/2011 | Dooley et al. | |
| 2013/0083062 A1 | 4/2013 | Geisner et al. | |
| 2016/0225187 A1* | 8/2016 | Knipp | G06T 19/006 |
| 2017/0200048 A1* | 7/2017 | Yamada | G01C 21/00 |

(Continued)

OTHER PUBLICATIONS

PCT/US2018/065516 International Search Report and Written Opinion dated Mar. 8, 2019.

*Primary Examiner* — Chante E Harrison
(74) *Attorney, Agent, or Firm* — Fletcher Yoder, P.C.

(57) ABSTRACT

Present systems and methods are directed to a system that includes a visualization device that includes a display viewable by a user. The system also includes a computer graphics generation system communicatively coupled to the visualization device. The computer graphics generation system includes a processor and a memory device communicatively coupled to the processor, such that the memory device stores instructions that cause the processor to generate an environment of real-world images, augmented-reality images, or a combination thereof. The instructions also cause the processor to receive and analyze data associated with the environment to determine an appropriate text location, determine appropriate textual characteristics for text based at least in part on the appropriate text location, and overlay the text having the appropriate textual characteristics onto the environment at the appropriate text location.

21 Claims, 6 Drawing Sheets

(56) References Cited

U.S. PATENT DOCUMENTS

| | | | |
|---|---|---|---|
| 2018/0033164 A1* | 2/2018 | Seo | G06T 7/90 |
| 2018/0174366 A1* | 6/2018 | Nishibe | G06F 3/04842 |
| 2018/0204362 A1* | 7/2018 | Tinsman | A63F 13/537 |
| 2018/0253901 A1* | 9/2018 | Charlton | G06T 19/006 |
| 2018/0315248 A1* | 11/2018 | Bastov | G06F 3/011 |
| 2018/0341811 A1* | 11/2018 | Bendale | G06T 7/593 |
| 2019/0108578 A1* | 4/2019 | Spivack | G06T 11/60 |
| 2019/0172261 A1* | 6/2019 | Alt | G06T 19/006 |

* cited by examiner

SYSTEMS AND METHODS FOR TEXTUAL OVERLAY IN AN AMUSEMENT PARK ENVIRONMENT

FIELD OF DISCLOSURE

The present disclosure relates generally to the field of amusement parks. More specifically, embodiments of the present disclosure relate to systems and methods that provide augmented and virtual reality experiences in amusement park attractions.

BACKGROUND

Amusement parks and/or theme parks may include various entertainment attractions, restaurants, and rides useful in providing enjoyment to guests (e.g., families and/or people of all ages) of the amusement park. Areas of the amusement park may have different themes that are specifically targeted to certain audiences. For example, certain areas may include themes that are traditionally of interest to children, while other areas may include themes that are traditionally of interest to more mature audiences. Generally, locations having themes associated with such an amusement park may be referred to as an attraction or a themed attraction.

Themed attractions may be established using fixed equipment, building layouts, props, decorations, and so forth, most of which generally relate to a certain theme. In situations where a different theme is to be established in the same location, the features associated with the older theme would be replaced with features associated with the newer one. Depending on the complexity of the location's theme, this could prove to be very difficult and time-consuming as decorations, furniture, equipment, props, and so forth are removed or replaced. Indeed, for certain types of attractions, relatively complex themes have become more common to provide guests with more immersive experiences.

It is now recognized that it is desirable to include attractions where it may be possible to change attraction themes, or to include or remove certain themed features in such attractions in a flexible and efficient manner relative to traditional techniques. It is also now recognized that it may be desirable to enhance the immersive experience of guests within attractions and to provide a more personalized or customized experience for guests.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a system includes a visualization device that includes a display viewable by a user. The system also includes a computer graphics generation system communicatively coupled to the visualization device. The computer graphics generation system includes a processor and a memory device communicatively coupled to the processor, such that the memory device stores instructions that cause the processor to generate an environment of real-world images, augmented-reality images, or a combination thereof. The instructions also cause the processor to receive and analyze data associated with the environment to determine an appropriate text location, determine appropriate textual characteristics for text based at least in part on the appropriate text location, and overlay the text having the appropriate textual characteristics onto the environment at the appropriate text location.

In accordance with an embodiment, a method includes generating, via one or more processors, an environment that includes real-world images, augmented-reality images, virtual-reality images, or any combination thereof. The method also includes analyzing, via the one or more processors, data related to the environment to determine an appropriate text location. Furthermore, the method includes determining, via the one or more processors, appropriate textual characteristics for text based at least in part on the appropriate text location and overlaying, via the one or more processor, the text having the appropriate textual characteristics onto the environment at the appropriate text location.

In accordance with an embodiment, a tangible, non-transitory, computer-readable medium stores instructions executable by one or more processors in a computer graphics generation system communicatively coupled to a visualization device worn by a user. The instructions cause the one or more processors to generate an environment visible to the user via the visualization device by displaying real-world images, virtual-reality images, augmented-reality images, or a combination thereof on a display of the visualization device. The instructions also cause the one or more processors to receive and analyze a signal indicative of a gaze direction of the user, receive and analyze data related to the environment, determine an appropriate text location based at least in part on the signal indicative of the gaze direction of the user and the data related to the environment, and overlay text onto the environment at the appropriate text location.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
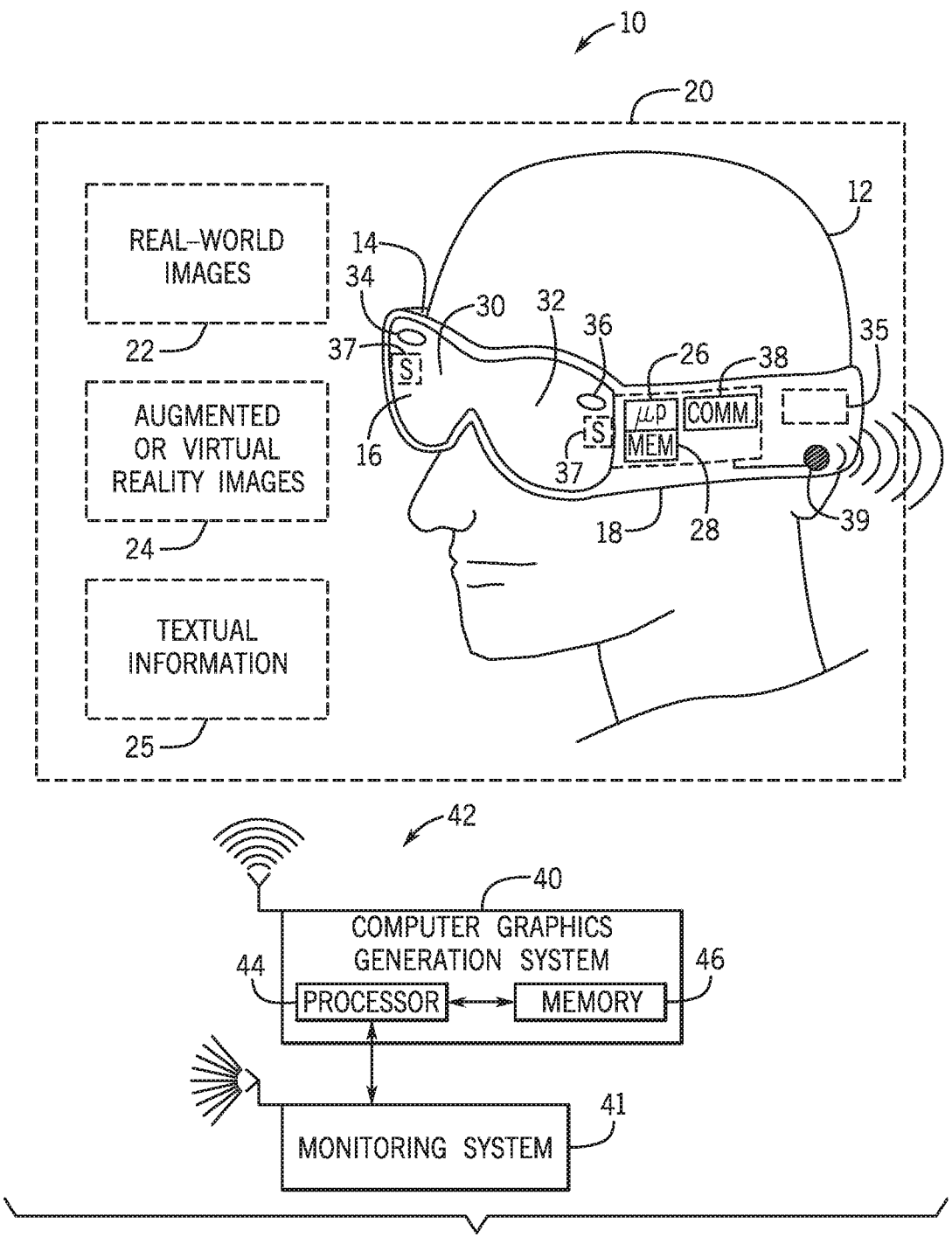
FIG. 1 is an illustration of a visualization device for use as augmented reality (AR) or virtual reality (VR) goggles and a computer graphics generation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing an augmented-reality (AR) experience, a virtual-reality (VR) experience, a mixed-reality (e.g., a combination of AR/VR) experience, or a combination thereof, as part of an attraction associated with an amusement park or a theme park. In an embodiment, systems and methods relate to providing text (e.g., subtitles) to enhance the AR experience, the VR experience, or the mixed reality experience. While certain embodiments are described with reference to an attraction in an amusement park to facilitate discussion, it should be understood that attractions are not necessarily limited to areas of an amusement park. Indeed, aspects of the present disclosure also relate to implementation in locations beyond the boundaries of an amusement park, such as in a hotel associated with the amusement park, in language education facilities, at music concert venues, or in vehicles that transport guests to and from the amusement park and/or hotel, for example.

With the foregoing in mind, certain attractions within the amusement park may include ride vehicles, which may enable one or more guests to view a surrounding environment. In one embodiment, the ride vehicle may travel along a ride path (e.g., track or rails). The one or more guests may be exposed to various sounds, such as the sound made by rollers driving the ride vehicle in motion, horns going off, other guests screaming, and the like, such that it may be difficult to hear any one particular sound. Furthermore, the AR, VR, or mixed reality experience may include various characters (e.g., virtual animated characters) providing a narrative (e.g., speaking or telling a story via a speaker system) while the one or more guests travel along the ride path. However, various sound disturbances (e.g., the rollers, guests screaming) may make it difficult for some guests to hear the narrative being told by the character. Accordingly, the narrative or any other information may be conveyed to the guests as text, providing content to one or more guests that may not be conveyed via sound because of such sound disturbances, for example. Indeed, displaying text or subtitles (e.g., on eyeglasses or electronic goggles) associated with the AR, VR, or mixed reality experience may allow the one or more users (e.g., guests) to interpret the narrative or receive any of a variety of messages (e.g., as text), thereby conveying information to the one or more users despite any difficulty associated with hearing sound. Such experiences may provide an attraction-filled experience for guests (e.g., users) of an amusement park that may be customizable, personalized, and/or interactive.

In one embodiment, combinations of certain hardware configurations, software configurations (e.g., algorithmic structures), as well as certain attraction features may be utilized to implement text (e.g., subtitles) with AR, VR, and mixed reality experiences. For example, in an embodiment, a system may include viewing devices such as wearable equipment (e.g., visualization devices such as electronic goggles or eyeglasses) through which amusement park guests and employees may view augmented, virtual, or mixed-reality scenes. Furthermore, the wearable equipment may include a surface that displays the text and other features of the AR, VR, or mixed reality experience. Certain implementations may be utilized to enhance guest (e.g., user) experiences by, for instance, virtually removing or adding features in an environment associated with an amusement park to provide adjustable virtual environments for different experiences in the same ride, to enable a guest to receive text associated with the AR, VR, or mixed reality experience without obstructing the view of important features of the experience, and so forth. In one embodiment, the wearable equipment may provide users with the text on the AR, VR, or mixed reality scenes. For example, the scenes viewed by users may include various virtual or real objects, such as animals. In one embodiment, the wearable equipment may provide users with the text associated with the virtual or real objects (e.g., animals). For example, the wearable equipment may provide users with the text regarding the animal species, the age of the animal, or a fact associated with of the animal. In one embodiment, a computer graphics generation system (e.g., a control system) communicatively coupled to the wearable equipment may determine a suitable position to display the text, such that the text is legible and does not obstruct the view of any features determined by the control system to be important.

Furthermore, certain data may be collected from the wearable equipment to enable more efficient use of computing power and/or other resources, for providing the text in suitable locations, for triggering effects or adjusting a show, or the like. In one embodiment, user visualization data may be collected. For example, a computer graphics generation system may determine whether a user in a ride has looked at a virtual or real object (e.g., in a certain direction) before initiating the display of any text associated with the virtual or real object. The wearable equipment may also be used to function as a ride operator heads-up display (HUD). Additionally or alternatively, certain amusement park attractions may include fixed viewing devices (e.g., binoculars) capable of providing text to enhance AR, VR, or mixed-reality scenes that users may use to view different areas of the amusement park or beyond.

Additional amusement park devices such as scent-releasing devices, speakers, actuatable effect devices, and so forth, may be controlled to cooperate with the viewing devices to provide an enhanced user experience. In this way, an environment being explored by a user may appear to react to the user's augmented or virtual experience. Further, in one embodiment, features may be incorporated into wearable items (e.g., electronic goggles or eyeglasses) to provide auditory, olfactory, and/or tactile input to a user to complement their visual AR, VR, or mixed reality experience.

To help illustrate, FIG. 1 depicts an embodiment of an AR/VR system 10 configured to enable a user 12 (e.g., a guest, an amusement park employee) to experience (e.g., view, interact with) controlled AR, VR, or mixed reality scenes. In accordance with an embodiment, the user 12 may purchase or otherwise be provided a visualization device 14, which may, in an embodiment, include electronic eyeglasses 16 (e.g., AR/VR eyeglasses, goggles). As described in further detail below, the visualization device 14 may include a wearable portion 18, illustrated as a headband, configured to house at least a portion of the electronic eyeglasses 16.

The visualization device 14 may be used alone or in combination with other features to create a surreal environment 20, which may include an AR experience, a VR experience, a mixed reality (e.g., a combination of AR/VR) experience, a computer-mediated reality experience, a combination thereof, or other similar surreal environment for the user 12. Specifically, the visualization device 14 may be worn by the user 12 throughout the duration of a ride or another predetermined activity, such as during a game, at the entry of a particular area of an amusement park, during a ride to a hotel associated with the amusement park, at the hotel, and so forth.

The visualization device 14 may include a device in which certain virtual features are overlaid onto a transparent surface (e.g., glasses), or may include a device in which virtual features are overlaid onto substantially real-time video, or a combination thereof (e.g., the visualization device 14 may be capable of switching between transparent and opaque user visualization). In an embodiment, the visualization device 14 may include features, such as light projection features, configured to project light into one or both eyes of the user 12 so that the virtual features are superimposed over real world objects. Such a visualization device 14 may be considered to include a retinal display.

Thus, in an embodiment, the user 12 may view the real world environment through a substantially transparent set of the electronic eyeglasses 16, with certain virtual features overlaid onto a surface of the electronic eyeglasses 16 (or the eyes of the user 12) so that the user 12 perceives that the virtual features are integrated into the real world environment. Alternatively or in addition, in an embodiment, the user 12 may view a real-time video of the real-world environment having overlaid virtual features.

In an embodiment, in wearing the visualization device 14, the user 12 may feel completely encompassed by the environment 20 and may perceive the environment 20 to be a real-world physical environment that includes certain virtual features. Specifically, the visualization device 14 may completely control the view of the user 12 (e.g., using opaque viewing surfaces) such that the environment 20 may be a real-time video (e.g., video captured at or near real-time) including real-world images 22 electronically merged with one or more AR/VR images 24 (e.g., virtual augmentations or virtual features). The real-world images 22 generally represent what that the user 12 would see, even when not wearing the visualization device 14 (e.g., the real-world images 22 are images of features in the real-world environments). The term "real-time" indicates that the images are obtained and/or provided in a timeframe substantially close to the time of actual observation. Indeed, the visualization device 14 may only partially control the view of the user 12 (e.g., using transparent viewing surfaces) such that the environment 20 is the actual environment with the AR/VR images 24 overlaid onto the transparent surfaces, or onto the eyes of the user 12. In accordance with an embodiment of the present disclosure, the AR/VR images 24 may function to overlay a real-world object so that the object appears to no longer be present or deleted (e.g., the real-world object is fully or partially occluded with a virtual object or virtual environmental representation). Furthermore, while certain examples disclosed herein relate to the real-world images 22 to facilitate discussion, it should be understood that any of the techniques disclosed herein may be adapted to overlay the AR/VR images 24 onto the real-world environment visible through transparent glasses of the visualization device 14. Thus, the real-world images 22 referenced in certain examples herein should be considered replaceable by real features in the real-world environment. When the AR/VR images 24 are overlaid onto the real-world images 22 or onto real features of the real-world environment viewed thru transparent glasses, the AR/VR images 24 may be considered AR images and may be considered to create an AR experience. When the AR/VR images 24 form an entirety of the environment 20 (e.g., without display of the real-world images 22 or enabling visualization of the real features of the real-world environment), the AR/VR images 24 may be considered VR images and may be considered to create a VR experience. As noted above, the visualization device 14 may be capable of switching between different types of visualizations.

Furthermore, in one embodiment, the visualization device 14 may provide text 25 to the user 12 while generating the environment 20. Specifically, the visualization device 14 may merge the text 25 with the real-world images 22 and/or the AR or VR images 24 to generate or to complete the environment 20. In an embodiment, the text 25 may provide the user 12 with information associated with the real-world images 22, the AR or VR images 24, or real features in the environment 20, as described in detail below. In one embodiment, the text 25 may be provided as a text bubble depicting content intended to be communicated by the real-world images 22, the AR or VR images 24, or real features in the environment 20. In one embodiment, the text bubble providing the text 25 may be coordinated with sound provided by the visualization device 14 or the ride system.

As illustrated in the cutaway portion of the visualization device 14, to support the creation of aspects of the environment 20, the visualization device 14 may include processing circuitry, such as a processor 26 and a memory 28. The processor 26 may be operatively coupled to the memory 28 to execute instructions for carrying out the presently disclosed techniques, for example generating the text 25 while displaying real-world images 22 and/or one or more AR/VR images 24. These instructions may be encoded in programs or code stored in a tangible non-transitory computer-readable medium, such as the memory 28 and/or other storage. The processor 26 may be a general-purpose processor, system-on-chip (SoC) device, an application-specific integrated circuit (ASIC), or some other similar processor configuration. Together, the memory 28 and the processor 26 may form all or a portion of an AR/VR computerized visualization system 40 (e.g., a computer graphics generation system).

In one embodiment, as further illustrated, the visualization device 14 may also include a pair of displays 30 and 32 (e.g., which may be provided in the frame front of the visualization device 14 where eyeglass lenses would otherwise appear), respectively corresponding to each eye of the user 12. Alternatively, a unified display may be employed. The respective displays 30 and 32 may each include, by way of non-limiting example, transparent lenses onto which the AR/VR images 24 and the text 25 can be overlaid (e.g., to overlay such images and text on the user's view of the real-world environment). Furthermore, the displays 30 and 32 may be display surfaces and may include features (e.g., circuitry, light emitters) located adjacent to their respective peripheries configured to facilitate overlaying the AR/VR images 24 and the text 25 to generate the environment 20.

Additionally or alternatively, the displays 30 and 32 may include an opaque liquid crystal display (LCD), an opaque organic light emitting diode (OLED) display, or other similar display useful in displaying the real-world images 22, the AR/VR images 24, and the text 25 to the user 12. In an embodiment, the respective displays 30 and 32 may each include a see-through LCD or a see-through OLED display useful in allowing, for example, the user 12 to view the AR/VR images 24 and the text 25 appearing on the respective displays 30 and 32 as an overlay to the actual and physical real world environment (e.g., an attraction associated with an amusement park).

Cameras 34 and 36 of the visualization device 14 may respectively correspond to the point of view of the user 12, and may be used to capture real-time video data (e.g., live video) or ambient light signals of the real-world. In one embodiment, a single camera may be employed. The visualization device 14 may also include additional cameras to track the user's eye movement, which when used in conjunction with a computing device (e.g., the computer graphics generation system 40), may facilitate determining textual characteristics, such as a suitable location for displaying the text 25, a suitable size of the text 25, a color of the text 25, a font of the text 25, and the like, as discussed in detail below. Specifically, the one or more sensors 37 may be eye tracking sensors (e.g., cameras) that may capture data to determine a gaze direction, a position of the pupil, a focal length, and/or any other suitable eye parameters. In an embodiment, the visualization device 14 includes one or more speakers 35 that deliver sound to the user 12. The speakers 35 may be positioned near the ear of a user 12. Communication features 38 (e.g., including a wireless transceiver 39) of the visualization device 14 may transmit data (e.g., video data, eye tracking data, environment data) at or near real-time to the processor 26 and/or the computer graphics generation system 40 for processing. The data transmitted by the communication features 38 may include data captured via the respective cameras 34 and 36, and/or the sensors 37 (e.g., eye tracking cameras), for example.

As depicted, the visualization device 14 may be communicatively coupled to the computer graphics generation system 40 (e.g., within the amusement park) via a wireless network 42 (e.g., wireless local area networks [WLAN], wireless wide area networks [WWAN], near field communication [NFC]). Alternatively or additionally, it should be understood that the real-time video data captured via the respective cameras 34 and 36 may be processed on the visualization device 14 via the processor 26. Further, the communication features 38 (e.g., wireless transceiver 39, input/output connectors), which are connected to the processor 26, may enable firmware and/or software included on the processor 26 and memory 28 to be updated and/or configured for particular uses.

The communication features 38 of the visualization device 14 may transmit orientation data, position data, point of view data (e.g., focal length, orientation, pose), motion tracking data, and so forth obtained and/or derived based on data obtained via sensors 37 of the visualization device 14. Such sensors 37 may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), eye tracking sensors, and others.

In an embodiment, features of the visualization device 14 (e.g., geometric aspects or markings) may be monitored by a monitoring system 41 (e.g., one or more cameras) to determine position, location, orientation, and so forth of the visualization device 14 and in turn, that of the user 12. The monitoring system 41 may be communicatively coupled to the computer graphics generation system 40 and used to identify position, location, orientation, and so forth of the user 12 (or multiple users).

The computer graphics generation system 40 includes processing circuitry, such as a processor 44 (e.g., general purpose processor or other processor) and a memory 46, and may process the real-time (or near real-time) video data (e.g., live video), orientation and position data, point of view data, environment data or any combination thereof received from the visualization device 14 or the monitoring system 41. Specifically, the computer graphics generation system 40 may use this data to generate a frame of reference to register the AR/VR images 24 and the text 25 to the real-world images 22 or to impose the AR/VR images 24 and the text 25 on the actual and physical environment. In one embodiment, the computer graphics generation system 40 may further use this data to determine textual characteristics (e.g., the appropriate position of the text 25 relative the environment 20 visible through the visualization device 14, the size of the text 25, the color of the text 25, the font of the text 25, the brightness or intensity of the text 25, and/or the duration for displaying the text 25) before imposing the text 25 on the environment 20. Specifically, using the frame of reference generated based on the orientation data, position data, point of view data, motion tracking data, and so forth, the graphics generation system 40 may then render a view of the AR/VR images 24 and include the text 25. In an embodiment, using the frame of reference generated based on the orientation data, position data, point of view data, motion tracking data, and so forth, the computer graphics generation system 40 may determine a suitable location for display of the text 25. In an embodiment, the graphics generation system 40 may render a view of the AR/VR images 24, the text 25, and the real-world images 22, in a manner that is temporally and spatially commensurate with the real world environment. The computer graphics generation system 40 may periodically update (e.g., at or near real-time) the rendering of text 25 to reflect changes in respective orientation, position, and/or motion of the user 12. For example, the computer graphics generation system 40 may identify a gaze direction (e.g., a direction the user 12 is looking toward) and may perform calculations (e.g., least-square approximation and singular value decomposition) to determine a plane that is substantially orthogonal to the gaze direction. The computer graphics generation system 40 may display the text 25 on the plane. In an embodiment, the computer graphics generation system 40 may track such data corresponding to a plurality of users (e.g., passengers of a ride, players in a shared game), where each user (or at least some users) have a corresponding visualization device 14.

As set forth above, in one embodiment, the visualization device 14 includes several components, and in general may include the electronic eyeglasses 16 configured to be worn on the head of the user 12. A variety of different configurations and implementations of the electronic eyeglasses 16 may be used, where the different configurations may have different sizes and shapes to better accommodate different sizes for different users, as well as different internal components (e.g., communication features, transducers, displays) to accommodate different implementations.

Figure 2:
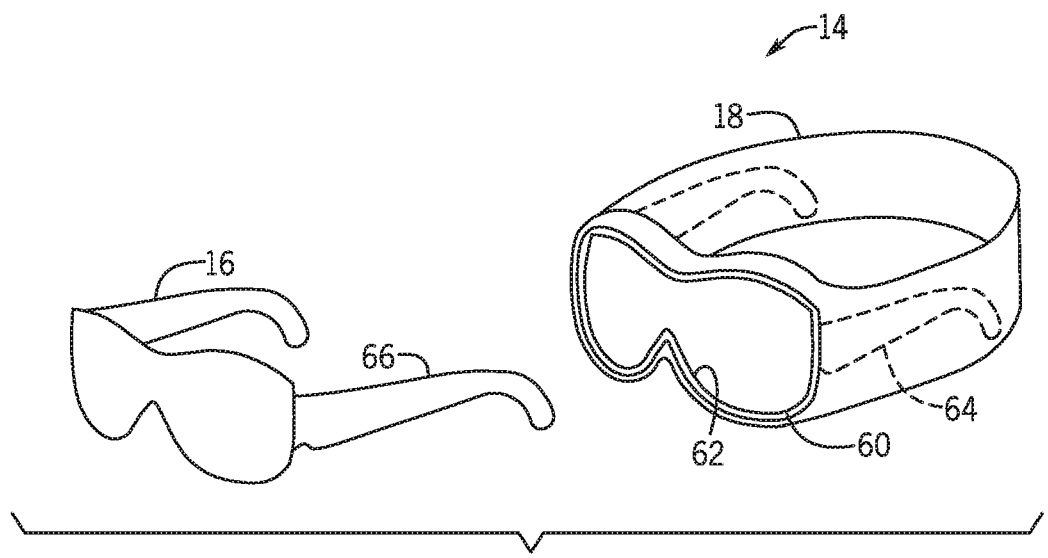
FIG. 2 is an exploded perspective view of the visualization device of FIG. 1, in accordance with an embodiment.
Figure 3:
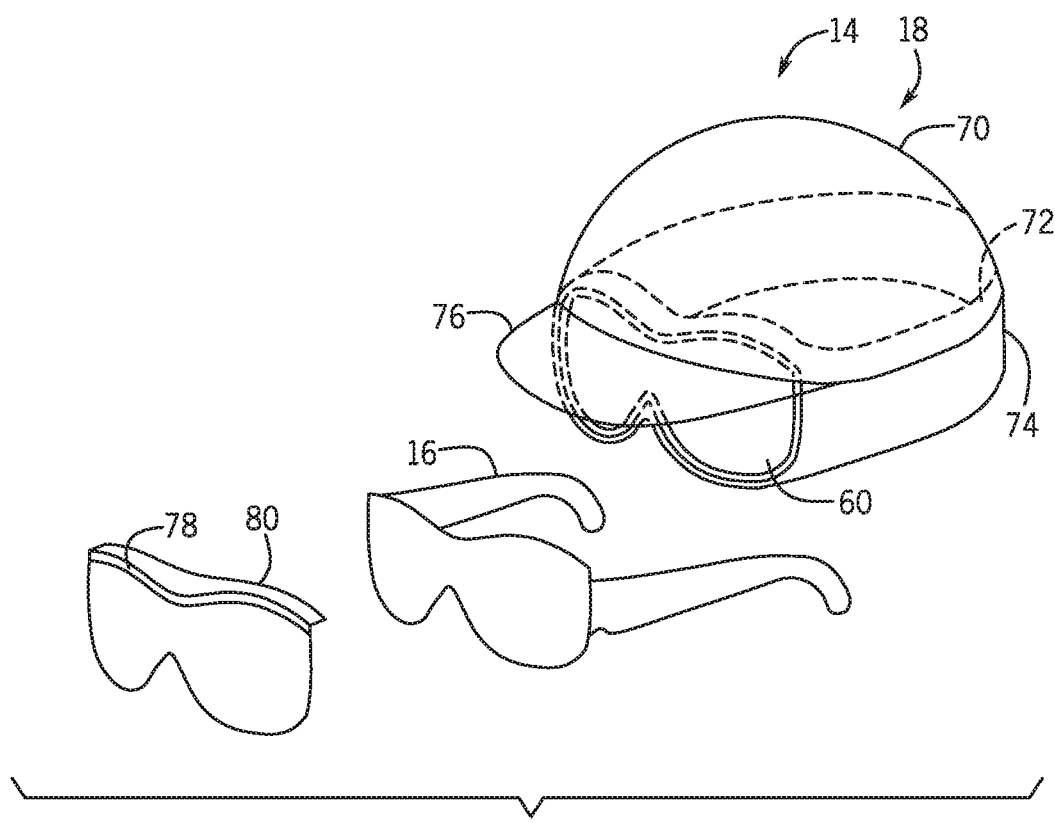
FIG. 3 is an exploded perspective view of another visualization device of FIG. 1, in accordance with an embodiment.

To provide additional flexibility and support for the electronic eyeglasses 16, the wearable portion 18 of the visualization device 14 may take a variety of forms, example embodiments of which are depicted in FIGS. 2 and 3. In FIG. 2, the visualization device 14 includes a headband as the wearable portion 18. Such an embodiment of the wearable portion 18 may include various materials configured to accommodate movement of the user 12 while providing comfort (e.g., elastic materials, sweat wicking materials, padding) for the user 12. It is presently recognized that it may be desirable to have a separate wearable portion 18 and electronic eyeglasses 16 to enable the wearable portion 18 to be washed from time to time without risk to the electronic components of the electronic eyeglasses 16. In an embodiment, the wearable portion 18 may incorporate one or more electronic components. Accordingly, the electronic components in the wearable portion 18 may be substantially sealed away from the environment to avoid damage.

In an embodiment, the wearable portion 18 of FIG. 2 includes a receptacle region 60 configured to receive the electronic eyeglasses 14, and to maintain the position of the electronic eyeglasses 14 relative to the eyes of the user 12 during use. In this regard, the receptacle region 60 may include a central portion 62 securable about the perimeter of the displays 30, 32 of the electronic eyeglasses 16, as well as side portions 64 configured to surround (e.g., partially or completely) arms 66 of the electronic eyeglasses 16.

The central portion 62 of the receptacle region 60 may include padding to allow for comfort of the user 12 while the headband provides adequate compressive force against the head of the user 12 (for maintenance of the position of the electronic eyeglasses 16). The central portion 62 may, in an embodiment, include one or more materials having a coefficient of friction against skin that provides an appropriate combination of stability and comfort. For example, gel materials commonly used in the nose region of eyeglasses may be appropriate.

As illustrated in an embodiment depicted in FIG. 3, the wearable portion 18 may include other features either in addition to a headband, or in lieu of a headband. As depicted, the wearable portion 18 includes a cap 70 to be worn over the head of the user 12, as well as features similar to the headband set forth in FIG. 2. In an embodiment and as shown, the cap 70 may include a securement region 72 where the cap 70 overlaps with a headband portion 74. The securement region 72 may include closure mechanisms such as hook-and-loop fasteners, hook-and-eye fasteners, buttons, magnetic strips, and so forth, configured to enable securement between the cap 70 and the headband portion 74. In this way, the cap 70 is separable from the headband portion 74, which allows them to be used separately or washed separately. Alternatively, in an embodiment, the headband portion 74 may be integral with the cap 70 (e.g., sewn into the cap 70) such that the headband portion 74 is not readily removable from the cap 70.

In an embodiment, the cap 70 includes a visor 76, which serves to shield the user's eyes, as well as the electronic eyeglasses 16 and its associated displays 30, 32 from strong illumination sources such as the sun, overhead lighting, and so forth. The visor 76 may, for example, be particularly useful in applications where the displays 30, 32 operate based on optical reflection and/or are transparent or semi-transparent. Indeed, the visor 76 may assist in enhancing the perceived visual contrast of the AR/VR images 24 against a real-world backdrop to improve the legibility of the text 25 depicted on the displays 30, 32 (e.g., by blocking unwanted light from an illumination source).

While not limited to the embodiment of FIG. 3, the illustrated visualization device 14 of FIG. 3 also includes a display cover 78 configured to be placed over the displays 30, 32 of the electronic eyeglasses 16. The display cover 78 may provide shade for the displays 30, 32 to protect the displays 30, 32 from physical abuse, to provide a degree of opacity for enhanced contrast and visualization of the text 25 and the AR/VR images 24, for optical filtering, and so on. The display cover 78 may include any appropriate securement mechanism, such as a clip 80, configured to removably attach the display cover 78 to the electronic eyeglasses 16. Other securement features, such as a temporary adhesive and/or hook-and-loop fasteners may be used.

Figure 4:
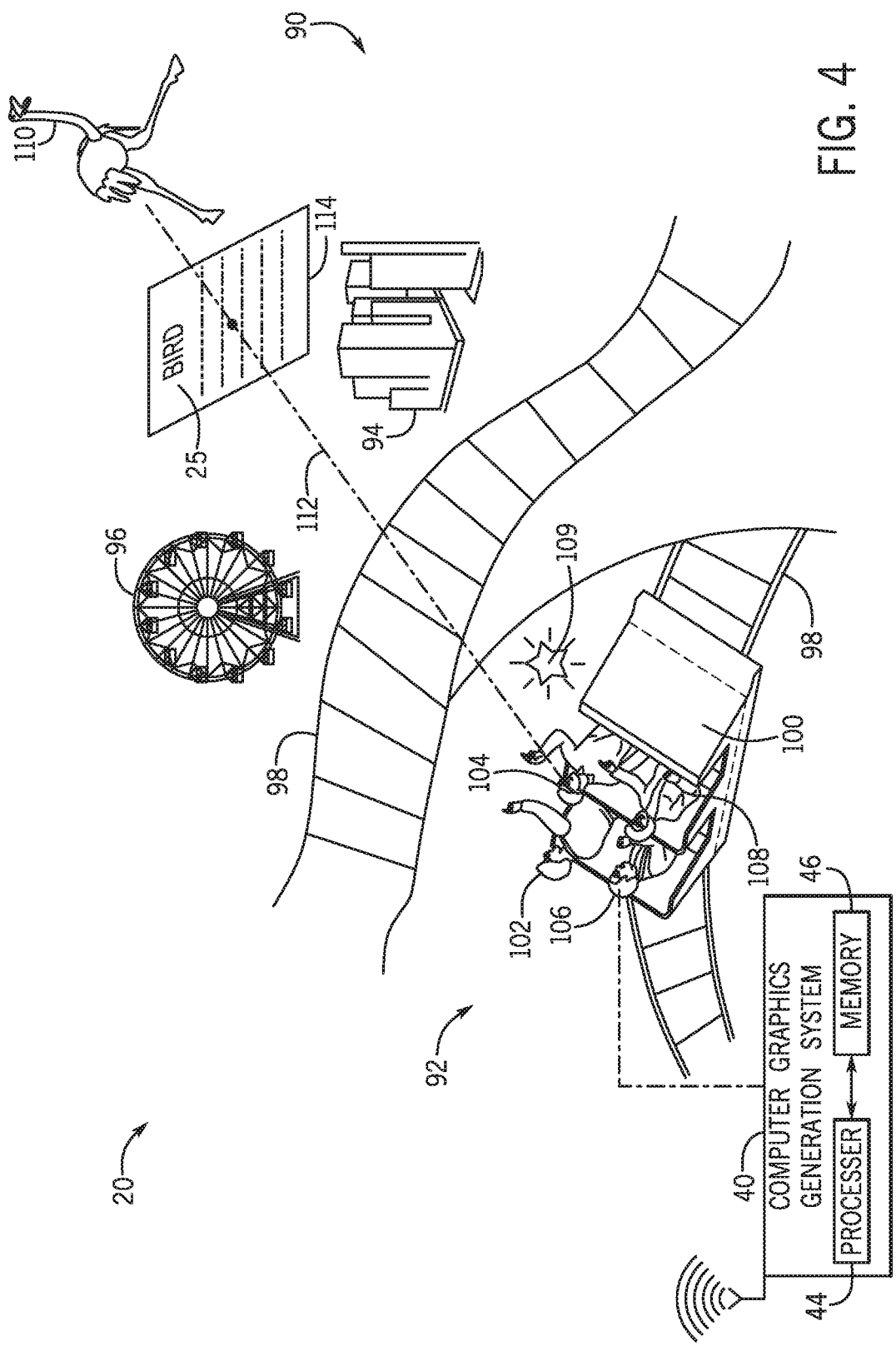
FIG. 4 is a perspective view of a thrill ride including an environment having various AR/VR images, as well as text, provided by way of the visualization device of FIG. 1, in accordance with an embodiment.

With the foregoing mind, it may be useful to describe an embodiment of a setting in which the AR/VR system 10 is used in an amusement park 90, as shown schematically in FIG. 4. FIG. 4 is a perspective view of a thrill ride 92 including the environment 20 that includes various AR/VR images 24 provided by way of the visualization device 14 of FIG. 1, in accordance with an embodiment. As illustrated, the amusement park 90 may include real-world features, such as the thrill ride 92, a mall of amusement park facilities 94 (e.g., game areas, hotels, restaurants, souvenir shops, and so forth), and additional amusement attractions 96 (e.g., Ferris wheel, dark ride, animated characters, or other attraction). In an embodiment, the thrill ride 92 may include a rollercoaster or other similar thrill ride, and thus, may further include a closed-loop track or a system of closed-loop tracks 98 (e.g., miles of tracks 98). The tracks 98 may be provided as an infrastructure on which a passenger ride vehicle 100 may traverse, for example, as ride passengers 102, 104, 106, 108 (one or more may be the user 12 of FIG. 1) ride the thrill ride 92. The tracks 98 may thus define the motion of the ride vehicle 100. However, in another embodiment, for example, the tracks 98 may be replaced by a controlled path, in which the movement of the ride vehicle 100 may be controlled via an electronic system, a magnetic system, or other similar system infrastructure other than the tracks 98. In other words, the ride path of the ride vehicle 100 may not be physically constrained to an exact path, thereby allowing the passengers 102, 104, 106, 108 some degree of control over their motion path, view perspective, and so forth. It should be appreciated that while the passenger ride vehicle 100 may be illustrated as a 4-passenger vehicle, in other embodiments, the passenger ride vehicle 100 may include any number of passenger spaces (e.g., 1, 2, 4, 8, 10, 20, or more spaces) to accommodate a single or multiple passengers.

As the ride vehicle 100 moves along the tracks 98, the ride passengers 102, 104, 106, 108 may be provided a moving tour of the scenery (e.g., facilities 94, additional amusement attractions 96, and so forth) in an area around or nearby the thrill ride 92. For example, this may include the environment surrounding the thrill ride 92 (e.g., a building that fully or partially houses the thrill ride 92). While the ride passengers 102, 104, 106, 108 may find the thrill ride 92 to be a very enjoyable experience, it may be useful to enhance their ride experience. Specifically, instead of having a physical view of only the facilities 94 (e.g., recreational areas, hotels, restaurants, souvenir shops, and so forth), additional amusement attractions 96 (e.g., Ferris wheel or other attractions), or other patrons or pedestrians within the amusement park 90, it may be useful to provide the ride passengers 102, 104, 106, 108 with an augmented reality (AR) experience or a virtual reality (VR) experience.

Additionally or alternatively, it may be useful to provide the ride passengers 102, 104, 106, 108 with the text 25, which may be related to one or more images (e.g., real-world images 22 and/or AR/VR images 24) or real-world features, via the visualization device 14. This may be done as the ride vehicle 100 moves along the tracks 98 or moves within a predefined area. In one embodiment, this may be done as amusement park patrons enjoy areas, such as the facilities 94 or amusement attractions 96. For example, the AR/VR 24 and/or suitable text 25 may be overlaid onto the real world environment by the electronic eyeglasses 16 so that the users 12 are able to experience additional entertainment features at restaurants, pathways between attractions, and the like.

Further, in an embodiment, the thrill ride 92 may involve user interaction with the AR/VR images 24, for example, simulated interaction with a first virtual object 109 (e.g., a star) and a second virtual object 110 (e.g., an animated animal) as the ride vehicle 100 passes by or through the virtual objects 109, 110. The ride vehicle 100 may be user-controlled, and one aspect of a game may be to interact with various virtual objects 109, 110 by directing the ride vehicle 100 toward the virtual objects 109, 110, or to avoid colliding with certain virtual objects 109, 110 by steering away from them. The simulated interaction may cause the virtual objects 109, 110 to be affected according to certain predetermined or modeled responses stored by the computer graphics generation system 40. As an example, the predetermined or modeled responses may be implemented by a physics engine or similar module implemented by the computer graphics generation system 40.

Furthermore, in an embodiment, the virtual objects 109, 110 may be generated by the computer graphics generation system 40 and displayed on the displays 30, 32 of the visualization devices 14. Specifically, the virtual objects 109, 110 may be superimposed on the real-world perception of the passengers 102, 104, 106, 108. Indeed, the first virtual object 109 may be a stationary depiction of a star and the second virtual object may be a moving (e.g., dynamic) depiction of a bird. That is, in one embodiment, the first virtual object 109 (e.g., the star) remains stationary relative to other objects of the environment and the second virtual object 110 (e.g., bird) may move relative to other objects in the environment. For example, for the environment 20 that includes a combination of real-world images 22 and other AR/VR images 24 (FIG. 1), the first virtual object 109 remains stationary relative to the real world images 22 (e.g., stationary relative to the real-world image 22 of the track 98), while the second virtual object 110 moves relative to the real world images 22.

Furthermore, the computer graphics generation system 40 may determine a gaze direction 112 (e.g., an axis aligned with and collinear to a direction the passenger is looking toward) for each of the passengers 102, 104, 106, 108 wearing the visualization device 14. In one embodiment, the sensors 37 (FIG. 1) may capture data (e.g., at or near real-time) indicative of the position of the pupil, focal length, and/or orientation of the visualization device 14 to determine the gaze direction 112. It should be appreciated that the gaze direction 112 may be determined with any of a variety of eye-tracking devices and algorithms. After determining the gaze direction 112, the computer graphics generation system 40 may determine a plane 114 to include the text 25. In particular, in one embodiment, the plane 114 is oriented substantially orthogonal to the determined gaze direction 112. Accordingly, the text 25 may be positioned on the plane 114, such that the text 25 is oriented to face toward the passenger along the gaze direction 112, thereby producing legible text 25.

In one embodiment, the gaze direction 112 may be used to determine the textual characteristics, which may be used to customize the text 25. For example, the computer graphics generation system 40 may determine the gaze direction 112 of the passenger 104 is oriented toward the second virtual object 110. In response to determining that the gaze direction 112 of the passenger 104 is oriented toward the second virtual object 110, the computer graphics generation system 40 may display text 25 associated with the second virtual object 110. In particular, the text 25 may include a speech bubble (e.g., including words that match a narrative spoken by the second virtual object 110), a diagram providing information about the second virtual object 110 (e.g., the type of bird, a max speed of the bird, regions of the world the bird is native to), and the like.

Figure 5:
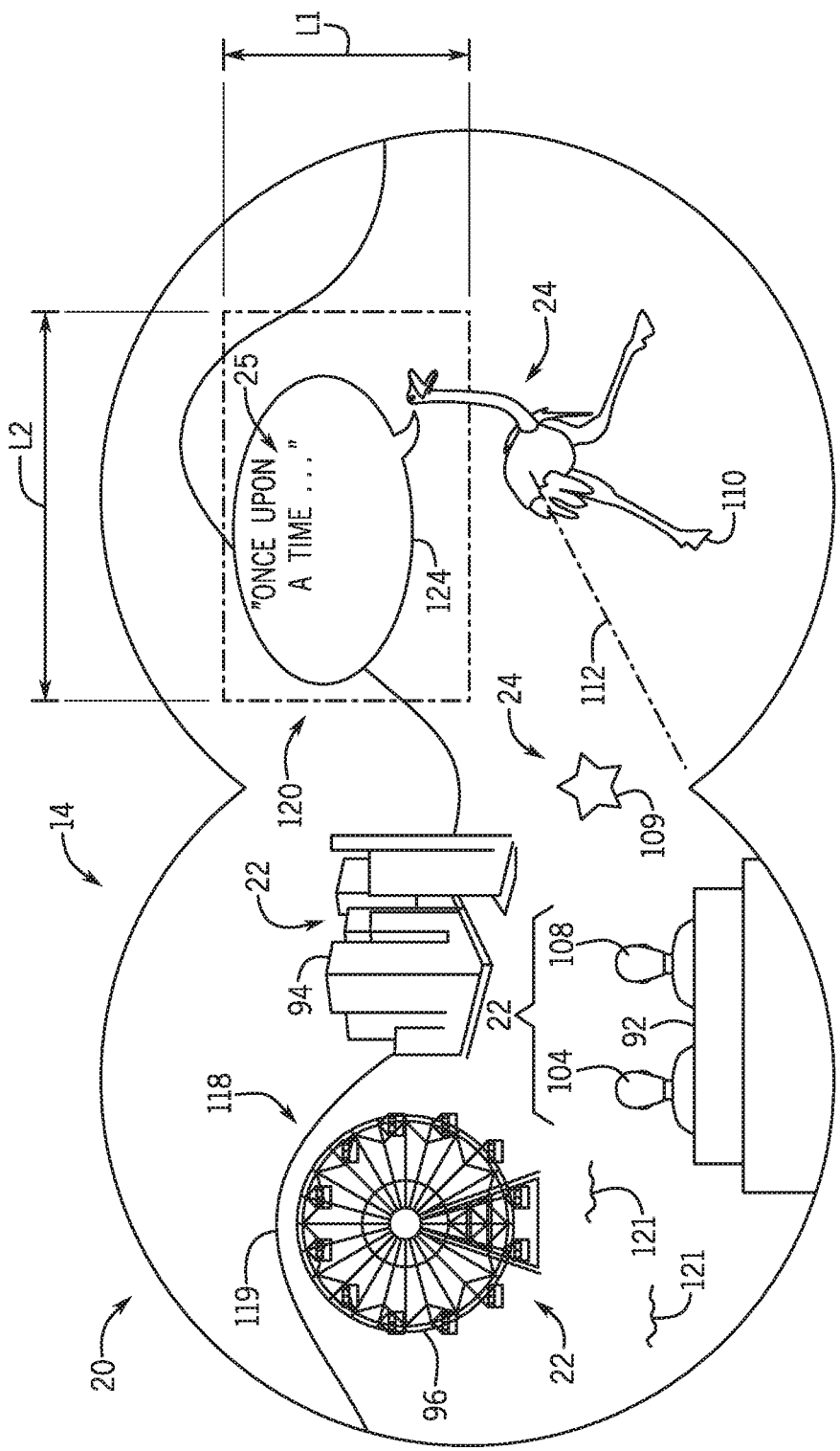
FIG. 5 is a view of an environment that may be visualized by a user wearing the visualization device of FIG. 1, as the user participates in the thrill ride of FIG. 4, in accordance with an embodiment.

FIG. 5 is a view of the environment 20 that may be visualized by a user (e.g., passenger 102, 106 of FIG. 4) wearing the visualization device 14 as shown, whereby the text 25 is overlaid onto the environment 20. The environment 20 may include the AR/VR images 24, such as the first virtual object 109 (e.g., the star) and the second virtual object 110 (e.g., an animated animal), that are overlaid onto the real-world images 22 (FIG. 1, 4), such as images of the thrill ride 92, the facilities 94, the passengers 104, 108, and the additional amusement attractions 96. As mentioned above, it should be appreciated that the techniques disclosed herein may be applied to overlay AR/VR images 24 and the text 25 onto the real-world environment visible through transparent glasses of the visualization device 14, rather than onto the real-world images 22 (e.g., images of the real-world environment). Accordingly, in one embodiment, a mixed-reality environment may be provided to the passengers via the visualization device 14. Furthermore, the computer graphics generation system 40 (FIG. 1) may facilitate displaying (e.g., overlaying) the text 25 onto the real-world environment. Thus, it should be understood that the techniques for overlaying the text 25 may be applied to VR environments, AR environments, real-world environments, mixed-environments, and the like.

In one embodiment, the computer graphics generation system 40 may receive environment data at or near real-time. The environment data may include data associated with the real-world images 22 and/or data associated with the AR/VR images 24. Specifically, the environment data includes a position of the real-world images 22 (e.g., the thrill ride 92, the facilities 94, the passengers 104, 108, and the additional amusement attractions 96) and a position of the AR/VR images 24 (e.g., the first and second virtual objects 109, 110). Specifically, in one embodiment, the environment data includes a position of the real-world images 22 and a position of the AR/VR images 24 on the environment 20, such that the position of the real-world images 22 and the position of the AR/VR images 24 is mapped onto the visualization device 14.

Furthermore, in one embodiment, the environment data may include an identifier for each image, such that the identifier labels each image as a real-world image 22, an AR/VR image 24, or an insignificant image 118. Specifically, in one embodiment, the identifier may label some real-world images 22 as significant and some real-world images 22 as insignificant images 118. The computer graphics generation system 40 may perform calculations (e.g., using one or more algorithms) to label the real-world images 22 as insignificant (e.g., insignificant images 118) when the computer graphics generation system 40 determines that the image does not add theming or is otherwise an image or feature that may be covered by the text 25.

In the depicted embodiment, the computer graphics generation system 40 may scan the area displayed on the visualization device 14 to determine an identifier for each image or each piece of content visible via the visualization device 14. For example, in the depicted embodiment, the computer graphics generation system 40 may associate the thrill ride 92, the facilities 94, and the additional amusement park attraction 96 with a first identifier, such that the first identifier labels these images as real-world images 22. The computer graphics generation system 40 may associate the first virtual object 109 and the second virtual object 110 with a second identifier, such that the second identifier labels these images as AR/VR images 24. In addition, the computer graphics generation system 40 may associate the mountain 119, the grass 121, and the passengers 104, 108 with a third identifier, such that the third identifier labels these images as insignificant images 118 based on calculations (e.g., using one or more algorithms). In an embodiment, the insignificant images 118 include images that do not add theming to the environment 20, for example, by serving as background (e.g., the sun, the clouds, other passengers, and the landscaping) or serve any other insignificant functions (or relatively less significant functions as compared to other images or features) as determined by the computer graphics generation system 40.

In an embodiment, the computer graphics generation system 40 may associate every area of the environment 20 visible through the visualization device 14 with either the first, second, or third identifier. However, it should be understood that in an embodiment, the computer graphics generation system 40 may not utilize any identifiers, utilize a portion of the identifiers (e.g., only the first, second, or third identifier), or utilize any additional identifiers to perform the techniques described herein.

The environment data may further include a size of each real-world image 22 and AR/VR image 24. For example, the computer graphics generation system 40 may determine a size of each image relative to the entire display area on the visualization device 14. That is, the computer graphics generation system 40 may determine what fraction (e.g., portion) of the entire environment 20 visible via the visualization device 14 each image occupies.

In an embodiment, the computer graphics generation system 40 may analyze the position, identifier, and/or size of each image to facilitate determining a suitable text region 120. Specifically, the text region 120 refers to a region on the display area on the visualization device 14 suitable for displaying the text 25, such that the text 25 is visible to the user wearing the visualization device 14 and/or does not interfere with the view of certain images or features.

In one embodiment, the computer graphics generation system 40 may use the environment data to determine the text region 120. It should be understood that in one embodiment the computer graphic generation system 40 may determine the position and size of the text region 120 based at least on the environment data. Specifically, the computer graphic generation system 40 may use the position of each image, the size of each image, the identifier of each image, and any other suitable environment data to determine the text region 120. For example, the computer graphic generation system 40 may determine the area including the largest portion of image(s) associated with the third identifier (e.g., insignificant images 118) as the text region 120, since displaying the text 25 at such an area may enable the user to view the text 25 without interfering with significant images, for example.

Furthermore, in one embodiment, the computer graphic generation system 40 may determine the text region 120 based on a priority scheme. The priority scheme may rank each image received, identified, or displayed on the visualization device 14 by level of importance. For example, the image associated with the text 25 (e.g., the image described by the text 25) may be ranked with highest priority and any large images associated with the third identifier (e.g., insignificant image 118) may be ranked with lowest priority. The computer graphic generation system 40 may determine the text region 120 to be located on the area of environment 20 visible with the visualization device 14 that includes an area large enough to accommodate the text 25 and/or that is ranked of the lowest priority based on the priority scheme of the computer graphic generation system 40.

Furthermore, in one embodiment, the computer graphic generation system 40 may receive an indication of the text 25 to display on the visualization device 14. The indication of the text 25 may include a time for displaying the text 25, the content of the text 25, and the image associated with the text 25. The time for displaying the text 25 may include a start time for displaying the text 25, a duration of the text 25, and an end time for displaying the text 25. The content of the text 25 may include subtitles or legible speech in coordination with sound (e.g., audible speech) associated with an image (e.g., real-world image 22 or AR/VR image 24), a description associated with an image, statistics associated with an image, or any other suitable content of the text 25. The image associated with the text 25 may include the image described by the text 25, the image producing the narrative conveyed via text 25, or the image associated with the gaze direction 112.

Furthermore, in one embodiment, the indication of the text 25 may be a text confirmation on the visualization device 14 in response to an action taken by the user 12 (e.g., ride passenger). For example, after the user 12 secures his/her seat belt, the computer graphics generation system 40 may receive an indication of this action (e.g., securing of the seat belt), whereby the computer graphics generation system 40 causes the visualization device 14 to display a confirmation text 25, such as "SECURED." Data indicative of the confirmation text may also be sent to a base-station controller and/or a remote operator for quality control purposes. For example, a ride operator may monitor the status of the user's seat belt by receipt of the text 25 confirming that the user's belt is locked in place by displaying text 25 on the respective visualization device 14 worn by the ride operator.

In one embodiment, the presentation of the text 25 may be based on the gaze direction 112 of the user 12 wearing the visualization device 14. For example, the computer graphic generation system 40 may determine that the gaze direction 112 (e.g., based on eye-tracking) is oriented toward the second virtual object 110, such that the computer graphic generation system 40 determines that the text 25 should be associated with the image closest to the gaze direction 112 (e.g., the second virtual object 110). In one embodiment, the text 25 is displayed in response to determination (e.g., by the computer graphics generation system 40) that the gaze direction 112 is directed toward a particular image (e.g., toward the second virtual object 110). However, it should be understood that the presentation of the text 25 may not be based on the gaze direction 112, but may additionally or alternatively be based on a timestamp during operation of the ride (e.g., presented during a certain portion of the ride), in response to presentation of a certain AR/VR image 24 (e.g., corresponding text 25 is presented with the AR/VR image 24), an action taken by the user 12, and the like.

Indeed, the computer graphic generation system 40 may use environment data, such as the position of each image, the size of each image, the identifier of each image, and/or any other suitable environment data to determine the position and the size of the text region 120. In addition or alternatively, the computer graphic generation system 40 may use characteristics of the text 25, such as the time for displaying the text 25, the content of the text 25, and/or the image associated with the text 25 to determine the position and the size of the text region 120.

For example, in the depicted embodiment, the computer graphic generation system 40 may identify the size, position, and/or identifier of each image (e.g., the thrill ride 92, the mall of amusement park facilities 94, the additional amusement attraction 96, the first virtual object 109, the second virtual object 110, the mountain 119, the grass 121, the passengers 104, 108, and/or any other image visible via the visualization device 14). Using any of the techniques described above, in the depicted embodiment, the computer graphic generation system 40 may determine that the position of the text region 120 is above the second virtual object 110 and the dimensions (e.g., size) of the text region 120. For example, the dimensions of the text region 120 may include a length of L1 and a width of L2. The computer graphic generation system 40 may determine this to be the position and size of the text region 120 because the computer graphic generation system 40 determines this to be the largest region of insignificant images 118 (e.g., images associated with the third identifier). While the depicted embodiment includes a substantially rectangular text region 120, it should be noted that the text region may be of any suitable shape (e.g., circular, triangular, pentagonal).

In one embodiment, the computer graphic generation system 40 may determine this to be the position and size of the text region 120 because this was the area closest to the image (e.g., the second virtual object 110) associated with the text 25. In the illustrated embodiment, the text 25 may be presented because the second virtual object 110 intersects with or is proximate to the gaze direction 112.

In one embodiment, the computer graphic generation system 40 may position the text 25 anywhere on the environment 20 visible through the visualization device 14, such that the text 25 does not block (e.g., interfere with) the image (e.g., the second virtual object 110) associated with the text 25. For example, the text 25 associated with the second virtual object 110 may include a text bubble of what the second virtual object 110 is saying (e.g., "Once upon a time . . . ") and may be positioned near the second virtual object 110, while not interfering with the view of the second virtual object 110.

As mentioned above, overlaying additional information, such as the text 25, to an environment including real-world images 22 and AR/VR images 24 may present many challenges. For example, it may be beneficial to determine the content of the text 25, the position on the environment 20 to display the text 25, the color of the text 25, and the brightness or intensity of the text 25, such that the text 25 does not blend into the background it is displayed on, and the like. Accordingly, in one embodiment, the computer graphic generation system 40 may determine the textual characteristics, such as the suitable text 25 to display, the position of the text 25 on the environment 20, the color of the text 25, and the like.

Specifically, the computer graphic generation system 40 may determine a suitable color for the text 25, such that the text 25 is more easily readable to the user 12 wearing the visualization device 14. In one embodiment, the text 25 may include a text box 124 (e.g., text bubble) within which the text 25 is displayed. The text box 124 may be one color and the text 25 may be a different color. For example, the text box 124 may be black and the text 25 may be white. It should be understood that the text box 124 may be omitted, the text 25 may be presented over the environment 20, and the text 25 may be a color that is substantially different than the area of the environment 20 on which the text 25 is displayed (e.g., a background color). For example, if the text 25 is displayed over a light-blue sky, the text 25 may be a dark color (e.g., black). However, if the text 25 is displayed over a dark wall, the text 25 may be a light color (e.g., white).

Additionally or alternatively, the computer graphics generation system 40 may determine a suitable brightness or intensity of the text 25 to provide adequate contrast between the images (e.g., the real-world images 22) and the text 25. For example, when the real-world images 22 include a high amount of sun exposure, the brightness or intensity of the text 25 may be increased to enhance the legibility of the text 25.

Figure 6:
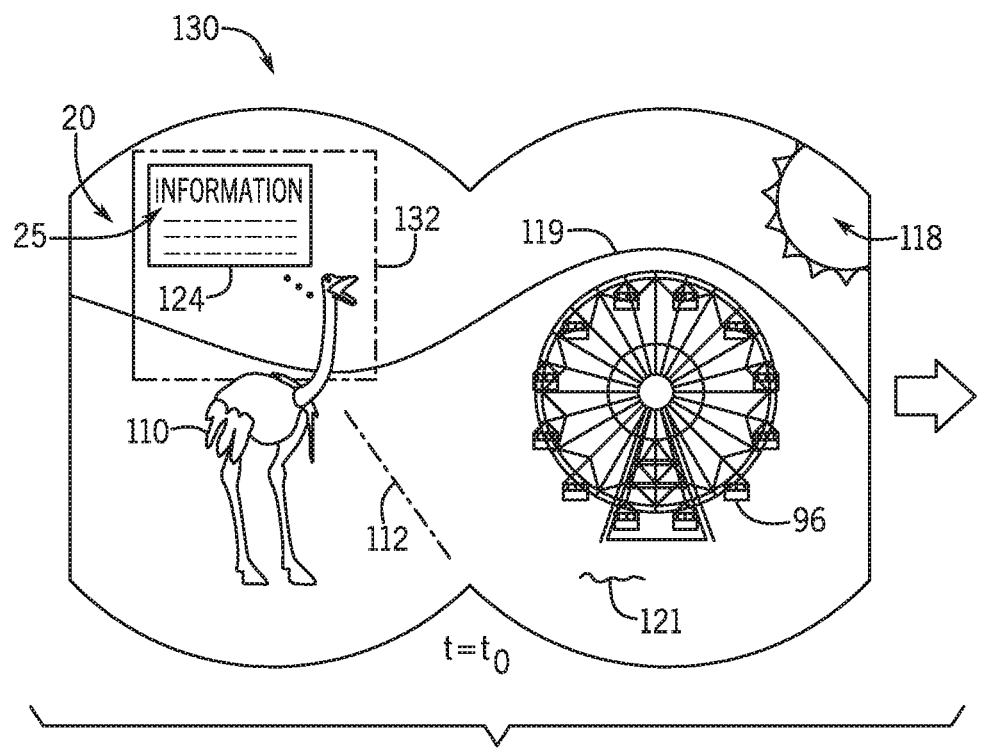
FIG. 6 is a view of the environment of FIG. 5 that may be visualized by the user wearing the visualization device of FIG. 1 at one point in time, in accordance with an embodiment.

Turning toward FIG. 6, depicted is a view 130 of the environment 20 that may be visualized by the user wearing the visualization device 14 at an instant in time, $t_0$. As shown, text 25 is overlaid onto the environment 20. At time, $t_0$, the computer graphics generation system 40 may determine that the text 25 should be displayed on a first text region 132 based the environment data. As mentioned above, the computer graphics generation system 40 may determine textual characteristics (e.g., the content of the text 25, the color of the text 25, the size of the text 25, the font of the text 25, the text duration) based on the position and size of the first text region 132. After determining the textual characteristics, the position and size of the first text region 132, and the images (e.g., the real-world images 22, the AR/VR images 24) collectively called "display parameters," the text 25 may be overlaid on the portion of the environment 20 that includes the first text region 132. Furthermore, the text 25 may be displayed on the text box 124 or directly on the environment 20, such that the text 25 is of a color different than that of the text box 124 or the environment 20 and is more easily deciphered by the user 12.

In one embodiment, the computer graphics generation system 40 may cause the visualization device 14 to display text 25 on the environment 20 (or the text box 124) at time, $t_0$. Indeed, the computer graphics generation system 40 may determine, at or near real-time, the text region 132, the textual characteristics, and the like (e.g., the display parameters). In one embodiment, the text 25 may be based on the gaze direction 112. For example, the text 25 may include information related to the second virtual object 110 when the computer graphics generation system 40 identifies the gaze direction 112 to intercept or be oriented along a direction in close proximity to the second virtual object 110. In particular, the computer graphics generation system 40 may determine the gaze direction 112 at time, $t_0$, and then display text 25 containing suitable text characteristics at a suitable location (e.g., the text region 132) shortly thereafter. In one embodiment, the computer graphics generation system 40 may display the text 25 until an end time, $t_1$. The time duration (e.g., the time between the time, $t_0$, and the time, $t_1$, may be pre-determined. However, it should be understood that the time duration for displaying the text 25 may be based on pupil activity (e.g., such that the computer graphics generation system 40 may identify when the user 12 has stopped reading the text 25), activity by the user 12, the significance of any images or features covered by the text, and the like.

In one embodiment, after the text 25 is overlaid on the environment 20, the text 25 may remain in that position on the visualization device 14 for the duration of the display (e.g., starting at time, $t_0$, and ending at the end time, $t_1$). For example, in the depicted embodiment, the text 25 is displayed on the first text region 132 on the text box 124 that is positioned on the left portion of the visualization device 14. In this example, when the user 12 wearing the visualization device 14 looks elsewhere, the text 25 may remain on the left portion of the visualization device 14. However, it should be understood that in one embodiment, the position of the text 25 on the visualization device 14 may be dynamically adjusted based on a change in view of the user 12 wearing the visualization device 14.

As mentioned above, the text 25 may be displayed on the environment 20 viewable via the visualization device 14 based on any suitable technique. For example, the text may be displayed on the environment 20 based on a time stamp, such that when a virtual object (e.g., the second virtual object 110) begins to speak, the text 25 matches the narrative of the speaking virtual object. Indeed, in one embodiment, the overlaying of the text 25 may be coordinated with audio associated with either the real world images 22 and/or the AR/VR images 24. In the depicted embodiment, the text 25 is related to the second virtual object 110 (e.g., because the gaze direction 112 is oriented toward the second virtual object). Furthermore, in an embodiment, the text 25 may be related to another image when the gaze direction is oriented toward the other image.

After the computer graphics generation system 40 has finished displaying text 25 (e.g., after the computer graphics generation system 40 has determined that the duration of the displaying of the text 25 has reached the end time, $t_1$), the computer graphics generation system 40 may cause the text 25 to be removed from the environment 20.

Figure 7:
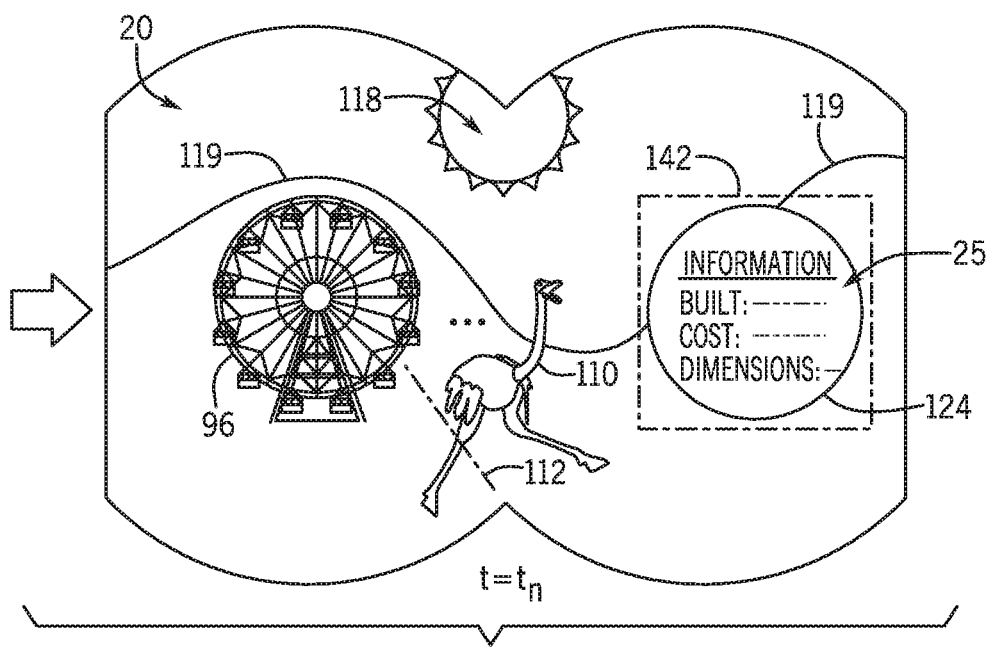
FIG. 7 is a view of the environment of FIG. 5 that may be visualized by the user wearing the visualization device of FIG. 1 at another point in time, in accordance with an embodiment.

Turning to FIG. 7, depicted is a view 140 of the environment that may be visualized by the user wearing the visualization device 14 at another instant in time, $t_n$. As shown, the text 25 is overlaid onto the environment 20. In one embodiment, after the text 25 displayed in the first perspective view 130 of FIG. 6 stops being displayed (e.g., because it has reached the end time, $t_1$, because the user 12 changes his orientation view, and the like), the computer graphics generation system 40 may wait until another start time, $t_0$, whereby the computer graphics generation system 40 may perform the techniques described above to determine the display parameters, such as the text region and text characteristics.

Specifically, at time, $t_n$, the computer graphics generation system 40 may determine that the text 25 should be displayed on a second text region 142 based on the environment data. In addition, the computer graphics generation system 40 may also determine the position and the size of the second text region 142 at the time, $t_n$. As mentioned above, the computer graphics generation system 40 may determine the textual characteristics (e.g., the content of the text 25, the color of the text 25, the size of the text 25, the font of the text 25) at the time, $t_n$. In an embodiment, the text characteristics of the text 25 displayed on the second text region 142 may be different than those of the text 25 displayed on the first text region 132 of FIG. 6. In the depicted embodiment, the text 25 may be about the additional amusement attraction 96 because the gaze direction 112 is identified by the computer graphics generation system 40 to be oriented toward the additional amusement attraction 96, for example.

After determining the textual characteristics and the position and size of the second text region 142, the text 25 may be overlaid on the portion of the environment 20 that includes the second text region 142. Furthermore, the text 25 may be displayed on the text box 124 or directly on the environment 20, such that the text 25 is of a color different than that of the text box 124 or the environment 20 and is more easily deciphered by the user 12. The displaying of the text 25 on the environment 20 may be continuously updated for the duration of the ride, such that the textual information and the position and size of the text region is determined when new text 25 is to be displayed (e.g., in coordination with a timestamp, the gaze direction 112, features of the thrill ride 92, and the like).

Figure 8:
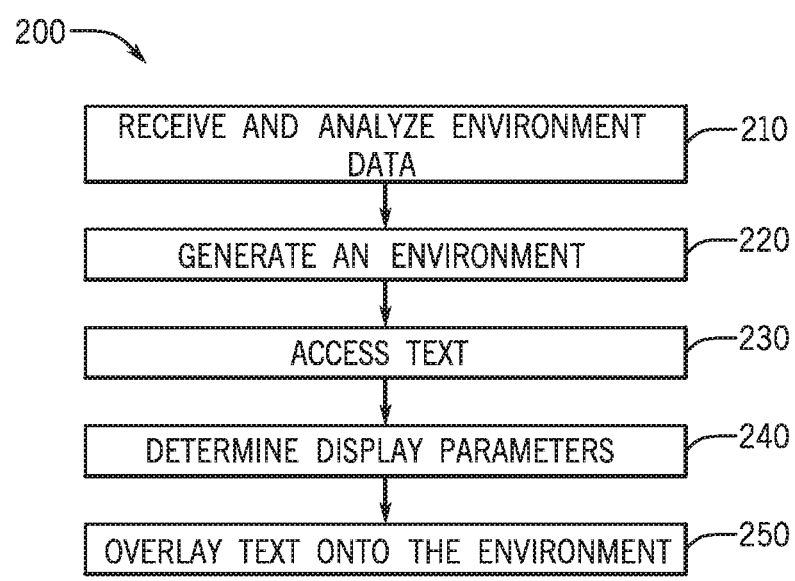
FIG. 8 is a flowchart of a process that may be used to create an enhanced experience by overlaying text onto the environment of FIG. 5 that is viewable with the visualization device of FIG. 1, in accordance with an embodiment.

FIG. 8 is a flowchart of a process 200 that may be used to create an enhanced experience by overlaying text 25 (FIGS. 1, 4-7) on the environment 20 (FIGS. 4-7) viewable through the visualization device 14 (FIGS. 1-7), in accordance with an embodiment. In particular, in one embodiment, the computer graphics generation device 40 (FIGS. 1-4) receives and analyzes environment data captured at or near real-time (process block 210). As mentioned above, the environment data may include data associated with the real-world images 22 (FIGS. 1, 4), data associated with the AR/VR images 24 (FIGS. 1-4), an identifier for each image in the environment 20 visible via the visualization device 14, the size and the position of each image in the environment 20 visible via the visualization device 14, and the like. The computer graphics generation system 40 may generate the environment 20 (process block 220), which may include the real-world images 22 and the AR/VR images 24. In an embodiment, the computer graphics generation system 40 may access textual information, such as the content of the text 25 (e.g., the words and characters included in the text 25) (process block 230). Then, the computer graphics generation system 40 may determine display parameters for the text 25 (process block 240), such that the computer graphics generation system 40 presents the text 25, modified to include the textual characteristics (e.g., content, color, size, font), onto the environment 20 (process block 250) at an appropriate text region 120. Indeed, the visualization device 14 may provide the user 12 wearing the visualization device 14 with text 25 overlaid on the environment 20.

In one embodiment, the computer graphics generation system 40 is communicatively coupled to the visualization device 14. The computer graphics generation system 40 may receive the environment data from the visualization device 14, such as the cameras 34, 36 (FIG. 1), and/or the sensors 37 (FIG. 1). As mentioned above, the environment data received by the computer graphics generation system 40 (process block 210) may include data associated with the real-world images 22, which may include the size and the position of each real-world image 22 displayed on the visualization device 14 relative to the size of the entire display surface (e.g., the displays 30, 32 [FIG. 1]). In addition, the environment data may include data associated with the AR/VR images 24, which may include the size and the position of each identified real-world image 22 displayed on the visualization device 14 relative to the size of the entire display surface. Furthermore, the environment data may include an identifier for each image (e.g., the real-world images 22 and the AR/VR images 24). In one embodiment, the computer graphics generation system 40 may assign an identifier to each image. For example, a first identifier may be assigned to an image by the computer graphics generation system 40, such that it labels the image as a real-world image 22. Furthermore, a second identifier may be assigned to another image, such that it labels the image as an AR/VR image 24. In addition or alternatively, a third identifier may be assigned to another image, such that the identifier labels the image as an insignificant image 118.

The computer graphics generation system 40 may analyze the environment data to generate the environment 20 (process block 220). In one embodiment, the environment 20 may include the real-world images 22 and the AR/VR images 24, such that they are combined to generate the environment 20. As mentioned above, the environment 20 may be updated based on the gaze direction 112 (FIGS. 4-6) of the user 12.

After generating the environment 20, the computer graphics generation system 40 accesses the text 25 (process block 230). In one embodiment, the text 25 may be pre-set content (e.g., characters and letters) stored in the memory 46 (FIG. 1) of the computer graphics generation system 40. Indeed, the computer graphics generation system 40 may access the text content (e.g., the words and characters the text includes) based on the environment data. For example, the environment data may include an AR/VR image 24 of a virtual object speaking, such that the text 25 accessed includes text 25 that is coordinated to match the verbal narrative of the speaking virtual object.

After accessing the text 25, the computer graphics generation system 40 may determine the display parameters (process block 240), as discussed in detail above. The display parameters may include the textual characteristics of the text 25, the position and size of the text region 120 (FIG. 5), and the images visible via the visualization device 14. In more detail, the textual characteristics include the text content accessed by the computer graphics generation system 40, the color of the text 25, the size of the text 25, the font of the text 25, the brightness or intensity of the text 25, and the text duration. Furthermore, the display parameters may be used to determine a suitable presentation of the text 25, such that the text 25 is more easily legible when overlaid onto the environment 20 and such that the text 25 does not interfere with important content (e.g., images) visible via the visualization device 14.

After determining the suitable display parameters (e.g., text characteristics, size and position of text region, and text content), the text 25 is overlaid onto the environment 20. That is, in an embodiment, the text 25 may be positioned on the area of the environment 20 with the most insignificant images 118 (FIG. 5). Indeed, the visualization device 14 may provide the user 12 wearing the visualization device 14 with text 25 overlaid on the environment 20 to further enhance the amusement park experience.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A system, comprising:
   a visualization device comprising a display viewable by a user;
   a computer graphics generation system communicatively coupled to the visualization device, wherein the computer graphics generation system comprises a processor and a memory device communicatively coupled to the processor and configured to store instructions configured to cause the processor to:
      generate an environment comprising real-world images, augmented-reality images, or a combination thereof;
      receive and analyze data associated with the environment to provide a data analysis, wherein the data analysis comprises indications of significance for the real-world images, the augmented-reality images, or the combination thereof;
      provide a ranking of the real-world images, the augmented-reality images, or the combination thereof based at least on the indications of significance;
      determine an appropriate text location based at least on the ranking;
      determine appropriate textual characteristics for text based at least in part on the appropriate text location;
      determine content for the text to correspond with a sound narrative provided via a speaker of the system; and
      overlay the text comprising the appropriate textual characteristics and comprising the content corresponding with the sound narrative onto the environment at the appropriate text location.

2. The system of claim 1, wherein the appropriate textual characteristics comprise a size of the text, a color of the text, a font of the text, a duration for displaying the text, or a combination thereof.

3. The system of claim 2, wherein the instructions are configured to cause the processor to determine the color of the text based on a respective background color at the appropriate text location.

4. The system of claim 1, wherein the data associated with the environment comprises a position, a size, or a combination thereof, of the real-world images or the augmented-reality images in the environment.

5. The system of claim 1, wherein the instructions are configured to cause the processor to determine the appropriate text location, wherein the appropriate text location is a location that covers one or more of the real-world images or the augmented-reality images having a relatively low calculated significance and that enables the user to visualize one or more of the real-world images or the augmented-reality images having a relatively high calculated significance.

6. The system of claim 1, wherein the instructions are configured to cause the processor to determine the appropriate text location, wherein the appropriate text location is a location that covers one or more of the real-world images or the augmented-reality imges having a relatively low calculated significance and that enables the user to visualize one or more of the real-world images or the augmented-reality images having a relatively high calculated significance.

7. The system of claim 1, wherein the instructions are configured to cause the processor to update the text in coordination with a timestamp, wherein the timestamp provides a start time and an end time for the processor to overlay the text.

8. The system of claim 1, wherein the instructions are configured to cause the processor to determine a gaze direction of the user and to determine the appropriate textual characteristics based at least in part on the gaze direction.

9. The system of claim 1, wherein the visualization device is configured to be worn by the user.

10. The system of claim 1, wherein the instructions are configured to cause the processor to update the text in coordination with a detected image of the real-world images, the augmented-reality images, or a combination thereof, to synchronize the overlay of the text with the sound narrative.

11. The system of claim 1, wherein the visualization device is configured to be worn by the user.

12. A method for overlaying text on a display of a visualization device, comprising:
generating, via one or more processors, an environment on the display, the environment comprising real-world images, augmented-reality images, virtual-reality images, or a combination thereof;
providing, via the one or more processors, a ranking of the real-world images, the augmented-reality images, the virtual-reality images, or the combination thereof based at least on relative significance of the real-world images, the augmented-reality images, the virtual-reality images or the combination thereof in the environment;
determining, via the one or more processors, an appropriate text location based at least on the ranking;
determining, via the one or more processors, appropriate textual characteristics for the text based at least in part on the appropriate text location;
determining, via the one or more processors, content for the text to correspond with a sound narrative provided via a speaker device; and
overlaying, via the one or more processor, the text comprising the appropriate textual characteristics and comprising the content corresponding with the sound narrative onto the environment on the display at the appropriate text location.

13. The method of claim 12, wherein the appropriate textual characteristics comprise a size of the text, a color of the text, a font of the text, a duration for displaying the text, or a combination thereof.

14. The method of claim 12, wherein determining, via the one or more processors, the appropriate text location is based on a position, a size, or a combination thereof, of the real-world images, the virtual-reality images, the augmented-reality images, or the combination thereof in the environment.

15. The method of claim 12, comprising updating, via the one or more processors, the text based on a timestamp, an action by a user, a change in a gaze direction of the user, a change in the real-world images, the augmented reality images, the virtual reality images within the environment, or a combination thereof.

16. The method of claim 12, comprising:
determining, via the one or more processors, a gaze direction of a user; and
determining, via the one or more processors, the appropriate text location bsaed at least in part on the gaze direction.

17. The method of claim 16, comprising determining, via the one or more processors, the appropriate textual characteristics based at least in part on the gaze direction.

18. A tangible, non-transitory, computer-readable medium that stores instructions executable by one or more processors in a computer graphics generation system communicatively coupled to a visualization device configured to be worn by a user, wherein the instructions are configured to cause the one or more processors to:
generate an environment visible to the user via the visualization device by displaying real-world images, virtual-reality images, augmented-reality images, or a combination thereof on a display of the visualization device;
receive and analyze a signal indicative of a gaze direction of the user;
receive and analyze data related to the environment;
determine an appropriate text location based at least in part on the signal indicative of the gaze direction of the user and the data related to the environment;
determine content for text to correspond with a sound narrative provided via a speaker of the visualization device; and
update, in synchronization with the sound narrative, the text in coordination with a position of a ride vehicle to overlay the text onto the environment at the appropriate text location.

19. The tangible, non-transitory, computer-readable medium of claim 18, wherein the instructions are configured to cause the one or more processors to determine textual characteristics of the text based at least in part on the appropriate text location.

20. The tangible, non-transitory, computer-readable medium of claim 18, wherein the instructions are configured to cause the one or more processors to determine appropriate textual characteristics of the text based at least in part on the gaze direction.

21. The system of claim 1, wherein the instructions are configured to cause the processor to update the text in coordination with a detected image of the real-world images, the augmented-reality images, or a combination thereof, to synchornize the overlay of the text with the sound narrative.

* * * * *